(12) United States Patent
Ha et al.

(10) Patent No.: US 8,456,133 B2
(45) Date of Patent: *Jun. 4, 2013

(54) CONTROL METHOD OF BATTERY-SYSTEM FOR IMPROVING SAFETY

(75) Inventors: Jin Woong Ha, Daejeon (KR); Jeeho Kim, Daejeon (KR); Yongshik Shin, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,629

(22) Filed: Mar. 30, 2012

(65) Prior Publication Data

US 2012/0187914 A1   Jul. 26, 2012

Related U.S. Application Data

(63) Continuation of application No. 12/310,875, filed as application No. PCT/KR2007/004221 on Sep. 1, 2007, now Pat. No. 8,212,524.

(30) Foreign Application Priority Data

Sep. 11, 2006 (KR) .................. 10-2006-0087134

(51) Int. Cl.
*H02J 7/00* (2006.01)
*H02J 3/00* (2006.01)
*H02J 1/00* (2006.01)

(52) U.S. Cl.
USPC ........... 320/116; 320/118; 320/119; 320/121; 307/77; 307/85

(58) Field of Classification Search
USPC .................. 320/116, 118, 119, 121
See application file for complete search history.

(56) References Cited

U.S. PATENT DOCUMENTS

| 4,425,628 A | * | 1/1984 | Bedard et al. ..................... 710/8 |
| 4,763,220 A | * | 8/1988 | Belbel et al. .................. 361/93.8 |
| 5,391,973 A | * | 2/1995 | Tomazic ....................... 320/120 |
| 6,046,514 A | * | 4/2000 | Rouillard et al. ............... 307/77 |
| 6,225,784 B1 | | 5/2001 | Kinoshita et al. |
| 6,404,607 B1 | * | 6/2002 | Burgess et al. ................. 361/58 |
| 6,664,000 B1 | | 12/2003 | Sonobe |

(Continued)

FOREIGN PATENT DOCUMENTS

| CN | 1607708 A | 4/2005 |
| JP | 2001-102092 A | 4/2001 |
| JP | 2002-110257 | 4/2002 |
| JP | 2002-142353 A | 5/2002 |

(Continued)

OTHER PUBLICATIONS

International Search Report, PCT/KR2007/004221.

*Primary Examiner* — M'Baye Diao
(74) *Attorney, Agent, or Firm* — Lerner, David, Littenberg, Krumholz & Mentlik, LLP

(57) ABSTRACT

Disclosed herein are a method of controlling the operation of battery modules in a battery system, which includes two or more battery modules or battery module assemblies, wherein the battery system further includes energy consuming loads for consuming charged energy, and the method includes, when a specific battery module or a specific battery module assembly is abnormally operated, connecting the abnormally operated battery module or the abnormally operated battery module assembly to the corresponding energy consuming load to forcibly discharge the charged energy, and a battery system that is capable of performing the battery system control method.

17 Claims, 1 Drawing Sheet

U.S. PATENT DOCUMENTS

| | | |
|---|---|---|
| 7,592,778 B2 | 9/2009 | Ooshita et al. |
| 2004/0167741 A1 | 8/2004 | Iwaizono |
| 2005/0007068 A1 | 1/2005 | Johnson et al. |
| 2006/0073377 A1 | 4/2006 | Al-Hallaj et al. |
| 2009/0039830 A1 | 2/2009 | Pellenc |

FOREIGN PATENT DOCUMENTS

| | | |
|---|---|---|
| KR | 20050040108 A | 5/2005 |
| KR | 20060086804 | 8/2006 |
| WO | WO 2005055358 A2 * | 6/2005 |

* cited by examiner

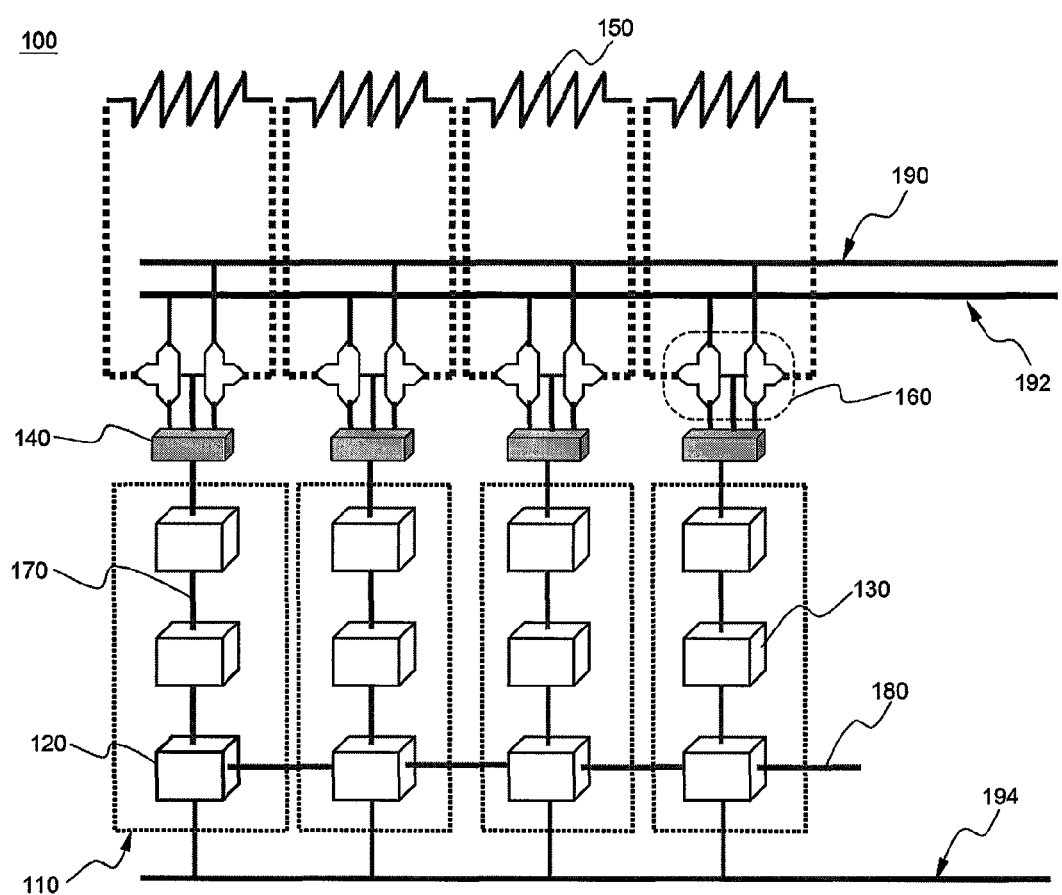

CONTROL METHOD OF BATTERY-SYSTEM FOR IMPROVING SAFETY

CROSS-REFERENCE TO RELATED APPLICATIONS

This application is a continuation of U.S. application Ser. No. 12/310,875 filed on Nov. 19, 2009, which is a national phase entry under 35 U.S.C. §371 of International Application No. PCT/KR2007/004221, filed Sep. 1, 2007, published in English, which claims priority from Korean Patent Application No. 10-2006-0087134, filed Sep. 11, 2006, the disclosures of which are hereby incorporated herein by reference.

FIELD OF THE INVENTION

The present invention relates to a battery system control method for safety improvement, and, more particularly, to a method of controlling the operation of battery modules in a battery system, which includes two or more battery modules or battery module assemblies, wherein the battery system further includes energy consuming loads for consuming charged energy, and the method includes, when a specific battery module or a specific battery module assembly is abnormally operated, connecting the abnormally operated battery module or the abnormally operated battery module assembly to the corresponding energy consuming load to forcibly discharge the charged energy, and a battery system that is capable of performing the battery system control method.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery system having a plurality of battery cells electrically connected with each other because high output and large capacity are necessary for the middle- or large-sized devices.

The middle- or large-sized battery system, which is used as a charging and discharging power source for electric vehicles and hybrid electric vehicles, is manufactured by electrically connecting a plurality of battery modules (battery cells) in series/parallel with each other and mechanically coupling the battery modules (battery cells) to each other.

Generally, a slave battery management system (BMS) is mounted to each battery module, and a master BMS is mounted to each battery module assembly, which includes a plurality of battery modules, for controlling the charge and discharge of each battery module and performing a control operation necessary to secure the safety of each battery module during the abnormal operation of each battery module. For securing the safety of each battery module and each battery module assembly, a control unit includes a control circuit for interrupting the operation of an abnormally operated battery module(s) or an abnormally operated battery module assembly(ies).

A large amount of energy is stored in each battery module after each battery module is charged. When each battery module is abnormally operated in this state, however, the charged energy assists in the abnormal negative reaction of each battery module, while each battery module is not connected to a corresponding external input and output terminal, with the result that the battery module may reach a dangerous state. For example, when a specific battery module is abnormally operated, during the movement of an electric vehicle, the dangerous state is maintained or further accelerated during the movement of the vehicle, if the abnormally operated battery module is not immediately replaced with a new one, even though a connection circuit for the abnormally operated battery module is broken.

Consequently, there is a high necessity for a technology that is capable of fundamentally solving the several above-mentioned problems.

BRIEF SUMMARY OF THE INVENTION

Therefore, the present invention has been made to solve the above problems, and other technical problems that have yet to be resolved.

Specifically, it is an object of the present invention to discharge an abnormally operated battery module(s) of a high-output, large-capacity battery system, which includes a plurality of battery cells or battery modules electrically connected to each other, thereby improving the overall safety of the battery system.

In accordance with one aspect of the present invention, the above and other objects can be accomplished by the provision of a method of controlling the operation of battery modules in a battery system, which includes two or more battery modules or battery module assemblies, wherein the battery system further includes energy consuming loads for consuming charged energy, and the method includes, when a specific battery module or a specific battery module assembly is abnormally operated, connecting the abnormally operated battery module or the abnormally operated battery module assembly to the corresponding energy consuming load to forcibly discharge the charged energy.

The battery system includes two or more battery modules or battery module assemblies and energy consuming loads for consuming energy of the battery modules or battery module assemblies. When a specific battery module or a specific battery module assembly is abnormally operated, the abnormally operated battery module or battery module assembly is electrically connected to the corresponding energy consuming load (for example, a resistor), not to an external device (for example, a vehicle motor), which requires energy from the battery module or battery module assembly, such that energy of the abnormally operated battery module or battery module assembly is forcibly discharged to the corresponding resistor. Consequently, the abnormally operated battery module or battery module assembly is prevented from affecting the external device.

In the battery system according to the present invention, the battery modules are connected in parallel, for example, to an external circuit, such as a vehicle motor, the battery system further includes a control unit located at the connection region between the external circuit and the respective battery modules for controlling the operation of the battery modules.

In this case, when the abnormal operation of a specific battery module is confirmed, the control unit disconnects the battery module from the external circuit and connects the battery module to the corresponding energy consuming load. As a result, the energy of the specific battery module is forcibly discharged to the corresponding energy consuming load, whereby the abnormally operated battery module is prevented from affecting the external device.

When the battery system according to the present invention includes a plurality of battery module assemblies, as previously described, each battery module assembly may include a plurality of battery modules electrically connected in series with each other via additional connection members. In this case, the respective battery module assemblies are electrically connected in parallel to the external circuit, and the battery system further includes a control unit (an upper control unit) located at the connection region between the external circuit and the respective battery module assemblies for controlling the operation of the battery module assemblies.

In the above-described construction, the battery modules, constituting each battery module assembly, preferably include control units (lower control units) for controlling the operation of the respective battery modules, and the lower control units are electrically connected to the upper control unit. Consequently, the operations of the respective battery modules are controlled by the corresponding lower control units, which are controlled by the upper control unit. As a result, the forcible discharge of the specific battery module confirmed by the corresponding lower control unit may be finally controlled by the upper control unit.

For example, the upper control unit may be a master battery management system (BMS), and the lower control unit may be slave BMSs, which are connected to the master BMS. Consequently, the master BMS controls the slave BMSs, and the slave BMSs control the charge and discharge of the respective battery modules and perform control operations necessary to secure the safety of the respective battery modules during the abnormal operation of the battery modules. The control operation for securing the safety of battery modules is accomplished by a control unit for interrupting the operation of an abnormally operated battery module(s) or an abnormally operated battery module assembly(ies).

Also, when the abnormal operation of a specific battery module is confirmed by the corresponding lower control unit (for example, slave BMS), the upper control unit (for example, master BMS) interrupts the connection between the battery module assembly, to which the abnormally operated battery module belongs, and the external circuit and connects the battery module assembly to the corresponding energy consuming load, whereby energy of the abnormally operated battery module is removed. Preferably, the method further includes performing a cooling process using a cooling unit to remove heat generated during the forcible discharge of the charged energy.

Each energy consuming load may be a resistance, a resistor, or a flywheel that is capable of backing energy up. When the flywheel is used for each energy consuming load, it is possible to rapidly transfer the energy of the battery module and to use the transferred energy in another place where energy is needed.

The abnormal operation of the specific battery module or the specific battery module assembly may be various depending upon the conditions of the battery system. In a preferred embodiment, the following operations are regarded as abnormal operations of the specific battery module or the specific battery module assembly.

(1) During the abnormal operation of the specific battery module or the specific battery module assembly, the battery module or the battery module assembly exhibits a voltage difference of 200 mV or more or an abrupt battery capacity reduction of 30% or more as compared to the remaining battery modules or the remaining battery module assemblies.

(2) During the abnormal operation of the specific battery module or the specific battery module assembly, the temperature of the battery module or the battery module assembly is increased to 70° C. or more, or the temperature of the battery module or the battery module assembly is gradually increased and is then sharply increased.

(3) During the abnormal operation of the specific battery module or the specific battery module assembly, the communication between the master BMS and the battery module or the battery module assembly is interrupted.

Consequently, when the abnormal operation of a specific battery module is confirmed, the master BMS prevents the abnormally operated battery module from affecting the external device through the corresponding slave BMS.

In accordance with another aspect of the present invention, there is provided a high-output, large-capacity battery system that is capable of performing the above-described method.

Specifically, the battery system according to the present invention includes two or more battery modules or battery module assemblies, energy consuming loads for consuming charged energy, and bypass members for connecting the battery modules or the battery module assemblies to the energy consuming loads.

Generally, the high-output, large-capacity battery system includes a plurality of battery modules, each of which includes a plurality of secondary batteries, or a plurality of battery module assemblies, each of which includes a plurality of battery modules. As a result, some secondary batteries, some battery modules, or some battery module assemblies may be abnormally operated. Furthermore, a great accident may occur due to the abnormal operation of some secondary batteries, some battery modules, or some battery module assemblies. Consequently, securing the safety is very important.

The battery system according to the present invention is preferably applied to a middle- or large-sized battery system having high output and large capacity. The range of the high output and large capacity may be changed depending upon a desired output, and therefore, the range of the high output and large capacity is not particularly restricted.

The battery system according to the present invention may be used as a power source for electric bicycles (E-bike), electric motorcycles, electric vehicles, and hybrid electric vehicles, or a power source for various applications and products, including industrial or domestic apparatuses, such as uninterruptible power supplies (UPS), idle reduction devices, and energy storage devices. Preferably, the battery system according to the present invention is used as a charging and discharging power source for an electric vehicle including a plurality of secondary batteries.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a view illustrating the construction of a battery system according to a preferred embodiment of the present invention.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

FIG. 1 is a view illustrating the construction of a battery system according to a preferred embodiment of the present invention.

Referring to FIG. 1, the battery system 100 includes four battery module assemblies 110, four field effect transistors (FET) 140, four forcible resistance units 150, and eight bypass members 160.

Battery modules constituting each battery module assembly 110 are electrically connected in series with each other via a connection member 170 (3S), and the battery module assemblies 110 are electrically connected in parallel with each other via a connection member 180 (4P).

When any one of the battery modules 130 or the battery module assemblies 110 is abnormally operated, a master battery management system (BMS) 120, for controlling the respective battery module assemblies 110, receives the problem caused by the abnormally operated battery module 130 or the abnormally operated battery module assembly 110 from a corresponding slave BMS to decide the interruption of use of the abnormally operated battery module 130 or the abnormally operated battery module assembly 110, the replacement of the abnormally operated battery module 130 or the abnormally operated battery module assembly 110 with a new one, or the removal of energy from the abnormally operated battery module 130 or the abnormally operated battery module assembly 110, based on the properties of the received problem. When the master BMS 120 decides to remove energy from the abnormally operated battery module 130 or the abnormally operated battery module assembly 110, the master BMS 120 transmits a signal to the FET of the abnormally operated battery module assembly, including the battery modules connected in series with each other. Subsequently, the FET controls the corresponding bypass member 160, with the result that current flows though the corresponding forcible resistance unit 150, not along a power line 190.

The energy of the abnormally operated battery module assembly 110 is forcibly consumed by the corresponding forcible resistance unit 150. At this time, a cooling unit (not shown) is operated, based on an instruction from the master BMS 120, to remove heat generated from the forcible energy consumption caused by the corresponding forcible resistance unit 150.

For example, when the communication between the master BMS and a specific battery module or a specific battery module assembly is interrupted at any one battery module, the battery module or the battery module assembly exhibits a voltage difference of 200 mV or more or an abrupt battery capacity reduction of 30% or more as compared to the remaining battery modules or the remaining battery module assemblies, or the temperature of the battery module or the battery module assembly is increased to 70° C. or more, or the temperature of the battery module or the battery module assembly is gradually increased and is then sharply increased, during the controlling of the respective battery module assemblies 110 by the master BMS 120, the master BMS 120 controls the operation of the abnormal battery module assembly 110 using the corresponding bypass member 160, and disconnects the power line 190, which is connected to the abnormal battery module assembly 110, from an external circuit (not shown) but connects the power line 190 to the corresponding forcible resistance unit 150 such that the energy from the abnormal battery module assembly 110 is consumed.

As previously described, each forcible resistance unit 150 may be a resistance, a resistor, or a flywheel that is capable of backing energy up.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Industrial Applicability

As apparent from the above description, the battery system includes additional energy consuming loads in addition to battery modules. Consequently, when a specific battery module or a specific battery module assembly is abnormally operated, it is possible to connect the abnormally operated battery module or the abnormally operated battery module assembly to the corresponding energy consuming load, such that charged energy, stored in the abnormally operated battery module or the abnormally operated battery module assembly, is forcibly consumed, thereby greatly improving the safety of the battery module or the battery module assembly.

The invention claimed is:

1. A method of controlling the operation of battery modules in a battery system, comprising two or more battery modules or battery module assemblies, wherein:
    the battery system further comprises energy consuming loads for consuming charged energy, and
    the method comprises, when a specific battery module or a specific battery module assembly is abnormally operated, disconnecting the abnormally operated battery module or the abnormally operated battery module assembly from an external circuit, where the external circuit uses energy from the specific battery module or the specific battery module assembly, and connecting the abnormally operated battery module or the abnormally operated battery module assembly to the corresponding energy consuming load to forcibly discharge the charged energy.

2. The method according to claim 1, wherein
the battery modules are connected in parallel to an external circuit, and
the battery system further includes a control unit located at the connection region between the external circuit and the respective battery modules for controlling the operation of the battery modules.

3. The method according to claim 2, further comprising
when the abnormal operation of the specific battery module or the specific battery module assembly is confirmed, disconnecting the abnormally operated battery module or the abnormally operated battery module assembly from the external circuit and connecting the abnormally operated battery module or the abnormally operated battery module assembly to the corresponding energy consuming load by the control unit.

4. The method according to claim 1, wherein
each battery module assembly comprises a plurality of battery modules connected in series with each other, the respective battery module assemblies are connected in parallel to the external circuit, and
the battery system further includes an upper control unit located at the connection region between the external circuit and the respective battery module assemblies for controlling the operation of the battery module assemblies.

5. The method according to claim 4, wherein the battery modules, constituting each battery module assembly, comprise lower control units for controlling the operation of the respective battery modules, and the lower control units are connected to the upper control unit.

6. The method according to claim 5, wherein, when the abnormal operation of a specific battery module is confirmed by the corresponding lower control unit, the upper control unit interrupts the connection between the battery module assembly, to which the abnormally operated battery module belongs, and the external circuit and connects the battery module assembly to the corresponding energy consuming load.

7. The method according to claim 1, wherein each energy consuming load is a resistance, a resistor, or a flywheel that is capable of backing energy up.

8. The method according to claim 7, wherein each energy consuming load is a flywheel.

9. The method according to claim 1, further comprising performing a cooling process using a cooling unit to remove heat generated during the forcible discharge of the charged energy.

10. The method according to claim 1, wherein, during the abnormal operation of the specific battery module or the specific battery module assembly, the battery module or the battery module assembly exhibits a voltage difference of 200 mV or more or an abrupt battery capacity reduction of 30% or more as compared to the remaining battery modules or the remaining battery module assemblies.

11. The method according to claim 1, wherein, during the abnormal operation of the specific battery module or the specific battery module assembly, the temperature of the battery module or the battery module assembly is increased to 70° C. or more, or the temperature of the battery module or the battery module assembly is gradually increased and is then sharply increased.

12. The method according to claim 1, wherein, during the abnormal operation of the specific battery module or the specific battery module assembly, the communication to the battery module or the battery module assembly is interrupted.

13. A high-output, large-capacity battery system comprising:
   two or more battery modules or battery module assemblies;
   energy consuming loads for consuming charged energy from battery modules or battery module assemblies operating abnormally;
   a power line for connecting the two or more battery modules or battery module assemblies to an external circuit; and
   bypass members for connecting the two or more battery modules or battery module assemblies to the energy consuming loads and to the power line, wherein each bypass member connects a specific battery module or a specific battery module assembly to a corresponding energy consuming load and to the power line.

14. The battery system according to claim 13, wherein the battery system is used as a charging and discharging power source for hybrid electric vehicles, electric vehicles, uninterruptible power supplies, idle reduction devices, or energy storage devices.

15. The battery system according to claim 13, wherein the battery system comprises four battery module assemblies, four field effect transistors (FET), four energy consuming loads, and eight bypass members, where each energy consuming load is a forcible resistance unit.

16. The battery system according to claim 15, wherein each battery module assembly is connected to two bypass members by one field effects transistor, and wherein each of the two bypass members are connected to the power line and to one forcible resistance unit.

17. The battery system according to claim 13, further comprising:
   a control unit that disconnects an abnormally operating battery module or an abnormally operating battery module assembly from the power line and connects the abnormally operating battery module or the abnormally operating battery module assembly to the corresponding energy consuming load.

* * * * *